US010515574B1

United States Patent
Chi et al.

(10) Patent No.: US 10,515,574 B1
(45) Date of Patent: *Dec. 24, 2019

(54) SCANNED MICROLED ARRAY FOR WAVEGUIDE DISPLAY

(71) Applicant: Facebook Technologies, LLC, Menlo Park, CA (US)

(72) Inventors: Wanli Chi, Sammamish, WA (US); Pasi Saarikko, Kirkland, WA (US); Hee Yoon Lee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,185

(22) Filed: Jul. 10, 2019

Related U.S. Application Data

(63) Continuation of application No. 16/178,269, filed on Nov. 1, 2018, now Pat. No. 10,395,575, which is a
(Continued)

(51) Int. Cl.
*G09G 5/02* (2006.01)
*G09G 3/02* (2006.01)
(Continued)

(52) U.S. Cl.
CPC ........... *G09G 3/025* (2013.01); *G02B 6/0001* (2013.01); *G02B 6/0016* (2013.01);
(Continued)

(58) Field of Classification Search
CPC ............ G09G 3/02; G09G 3/025; G09G 3/20; G09G 3/2096; G09G 3/34; G09G 3/346; G09G 3/3406
See application file for complete search history.

(56) References Cited

U.S. PATENT DOCUMENTS 6,194,119 B1    2/2001    Wolk et al.
6,304,237 B1   10/2001    Karakawa
(Continued)

FOREIGN PATENT DOCUMENTS

WO    WO 2013/163347 A1    10/2013
WO    WO 2015/078788 A1     6/2015
WO    WO 2016/020643 A1     2/2016

OTHER PUBLICATIONS

European Extended Search Report, European Application No. 17208645.6, dated May 3, 2018, 8 pages.
(Continued)

*Primary Examiner* — Vijay Shankar
(74) *Attorney, Agent, or Firm* — Fenwick & West LLP

(57) ABSTRACT

A waveguide display includes a source assembly, an output waveguide, and a controller. The source assembly includes a light source and an optics system. The light source includes source elements arranged in a 1D or 2D array that emit image light. The optics system includes a scanning mirror assembly that scans the image light to particular locations based on scanning instructions. The output waveguide receives the scanned image light from the scanning mirror assembly and outputs an expanded image light. In some embodiments, the waveguide display includes a source waveguide and the 1D array of source elements. The source waveguide receives a conditioned image light from the source assembly. The controller generates the scanning instructions and provides the scanning instructions to the scanning mirror assembly. In some embodiments, the controller provides the scanning instructions to an actuator assembly of the source waveguide.

20 Claims, 10 Drawing Sheets

Related U.S. Application Data continuation of application No. 15/343,466, filed on Nov. 4, 2016, now Pat. No. 10,157,559.

(60) Provisional application No. 62/294,131, filed on Feb. 11, 2016.

(51) Int. Cl.
*F21V 8/00* (2006.01)
*G09G 3/34* (2006.01)
*G09G 3/20* (2006.01)
*G02B 26/08* (2006.01)
*G02B 26/10* (2006.01)
*G02B 27/14* (2006.01)
*G02B 27/01* (2006.01)

(52) U.S. Cl.
CPC ....... *G02B 6/0035* (2013.01); *G02B 26/0833* (2013.01); *G02B 26/101* (2013.01); *G02B 26/105* (2013.01); *G02B 27/0172* (2013.01); *G02B 27/141* (2013.01); *G02B 27/145* (2013.01); *G09G 3/2096* (2013.01); *G09G 3/346* (2013.01); *G09G 3/3406* (2013.01); *G02B 2027/0114* (2013.01); *G02B 2027/0125* (2013.01); *G02B 2027/0178* (2013.01)

(56) References Cited

U.S. PATENT DOCUMENTS

| | | | |
|---|---|---|---|
| 6,327,083 | B1 | 12/2001 | Goldenberg et al. |
| 6,869,185 | B2 | 3/2005 | Kaminsky et al. |
| 10,056,020 | B2 | 8/2018 | Chi et al. |
| 10,157,559 | B2 | 12/2018 | Chi et al. |
| 10,395,575 | B1* | 8/2019 | Chi .................. G09G 3/2096 |
| 2004/0076203 | A1 | 4/2004 | Kaminsky et al. |
| 2006/0132914 | A1 | 6/2006 | Weiss et al. |
| 2010/0246003 | A1 | 9/2010 | Simmonds et al. |
| 2013/0314789 | A1 | 11/2013 | Saarikko et al. |

OTHER PUBLICATIONS

United States Office Action, U.S. Appl. No. 15/342,466, dated Feb. 20, 2018, 9 pages.

\* cited by examiner

SCANNED MICROLED ARRAY FOR WAVEGUIDE DISPLAY

CROSS REFERENCE TO RELATED APPLICATIONS

This application is a continuation application of co-pending U.S. application Ser. No. 16/178,269, filed Nov. 1, 2018, which is a continuation application of U.S. application Ser. No. 15/343,466, filed Nov. 4, 2016, now U.S. patent Ser. No. 10/157,559, which claims the benefit of U.S. Provisional Application No. 62/294,131, filed Feb. 11, 2016, each of which is incorporated by reference in its entirety.

BACKGROUND

This disclosure relates generally to near-eye-displays, and in particular, to near eye displays including scanning MicroLED arrays.

In conventional display designs in near-eye-displays, the common factors considered are brightness, resolution/FOV, and compactness. In augmented reality (AR) applications using next generation displays, often a wideband source is preferable than single wavelength laser. MicroLEDs are a good choice for such displays due to their wide spectrum and high brightness. But the small array size in MicroLED technology limits a simple 2D display resolution to about 640×480. In addition, the display size is also large due to large pixel pitch and low fill factor of the array.

SUMMARY

A waveguide display used as part of a virtual reality (VR) system, an augmented reality (AR) system, a mixed reality (MR) system, or some combination thereof. In some embodiments, the waveguide display may be included in an eye-wear comprising a frame and a display assembly that presents media to a user's eyes. The display assembly includes a source assembly and an output waveguide. The source assembly includes a light source which emits image light to the output waveguide which expands the image light and outputs the expanded image light to the user's eyes. In some embodiments, the display assembly includes the source assembly, the output waveguide and a source waveguide. The source waveguide is a long and narrow waveguide that expands the image light emitted by the source assembly to the output waveguide in one dimension.

The source assembly includes a light source, and an optics system. A controller controls one or more scanning components of the display assembly. In some embodiments, the controller controls the scanning of the source waveguide, which outputs the image light toward the output waveguide. In some embodiments, the controller controls one or more scanning mirrors, which outputs the image light toward the output waveguide.

The light source includes one or more source elements (e.g., microLEDs). The one or more source elements may emit light in the same wavelength range (e.g., all emit the same color). Alternatively, some source elements may emit light at different wavelength ranges than other source elements (e.g., one source emits in red, another emits in blue, and another emits in green). In some embodiments, a plurality of source elements forms an array. In some embodiments, the array is one dimensional, linear array of source elements. Alternatively, the array may be a two-dimensional array of source elements (e.g., a spare array). Additionally, in some embodiments, the array may be a curved array— which mitigates field curvature. Additionally, in some embodiments, each of the plurality of source elements may be in contact with an optical isolator (e.g., Aluminum film) that helps reduce optical interference between adjacent source elements.

The optics system includes one or more optical elements that condition (e.g., expand and/or collimate) light received from the light source. The optics system may also include one or more scanning mirrors (e.g. galvanometer mirror, MEMS mirror) that scan light received from the collimating lens. The one or more scanning mirrors may perform a scanning along one or two dimensions. The use of one dimensional arrays, sparse 2D arrays, and/or MicroLEDs also helps reduce design constraints for the scan angle and resonance frequency of the scanning mirror assembly. The scanning mirrors emit the scanned light to the output waveguide, such that a scanned image is ultimately output from the output waveguide. In some embodiments, the optics system does not include the one or more scanning mirrors.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
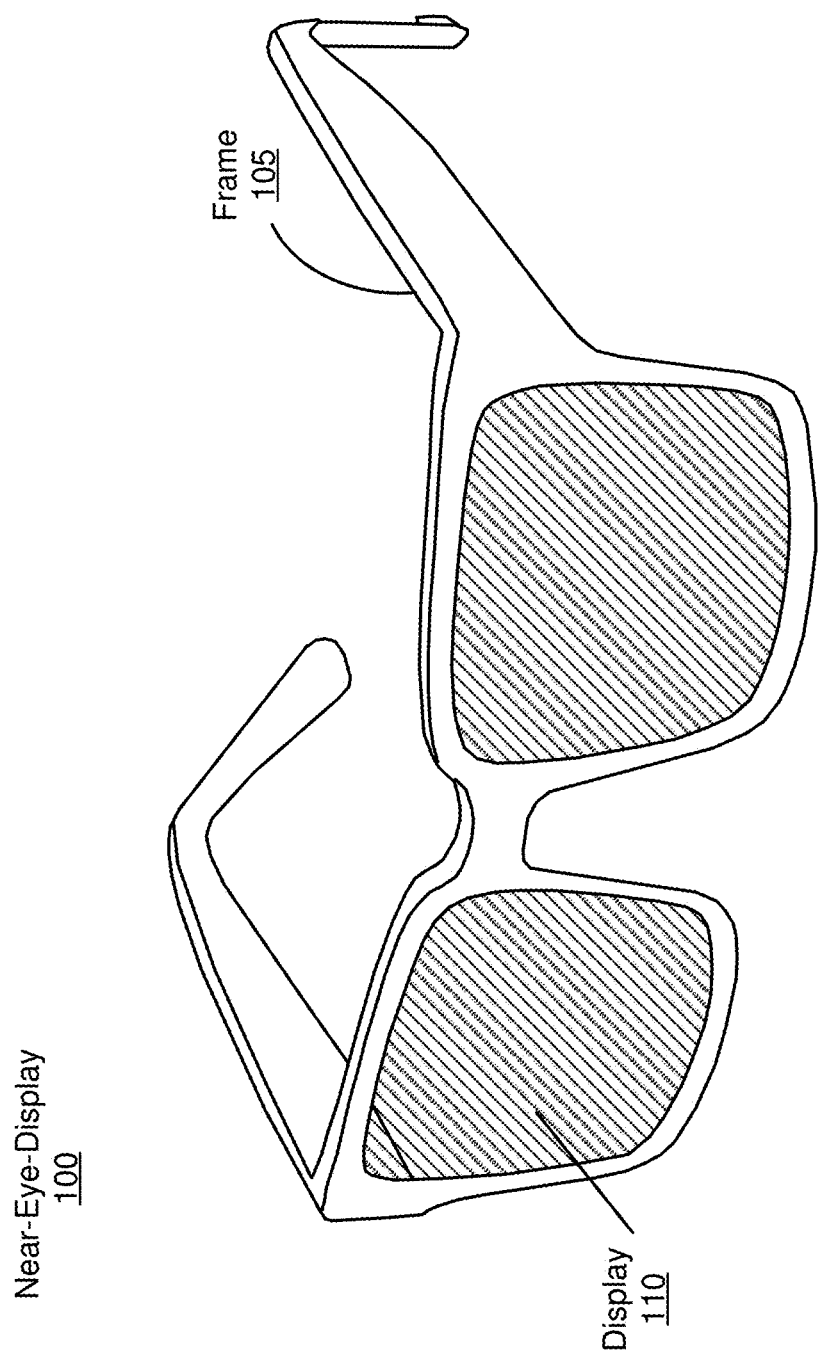
FIG. 1 is a diagram of a near-eye-display (NED), in accordance with an embodiment.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light to present media to an eye of the user. The source assembly includes, e.g., a source, an optics system, or some combination thereof.

FIG. 1 is only an example of a VR system. However, in alternate embodiments, FIG. 1 may also be referred to as a Head-Mounted-Display (HMD).

Figure 2:
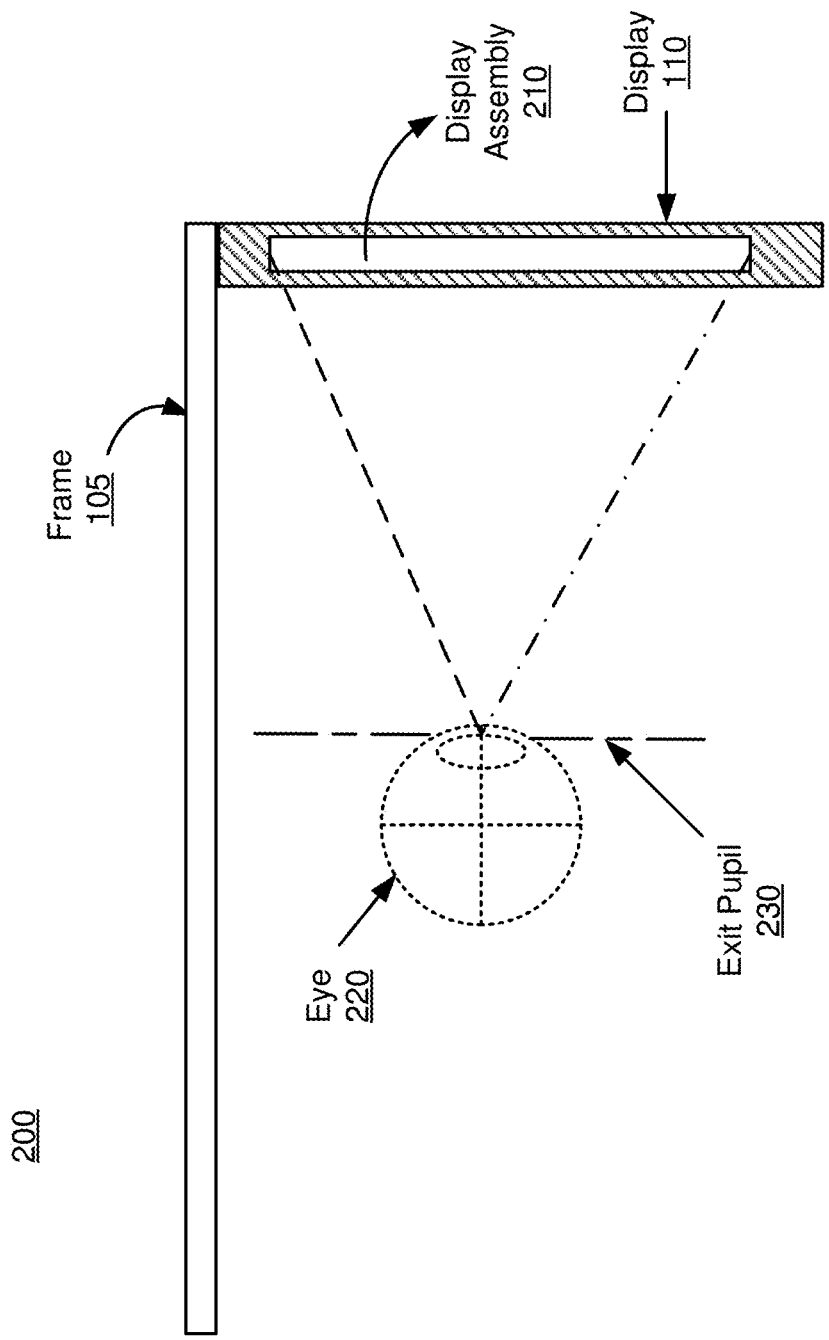
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 includes at least one display assembly 210, and an exit pupil 230. The exit pupil 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210, as illustrated below in FIG. 2, is configured to direct the image light to the eye 220 through the exit pupil 230. The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

In some embodiments, the display assembly 210 may include a source assembly to generate an image light to present media to user's eyes. The source assembly includes, e.g., a source, an optics system, or some combination thereof.

Figure 3:
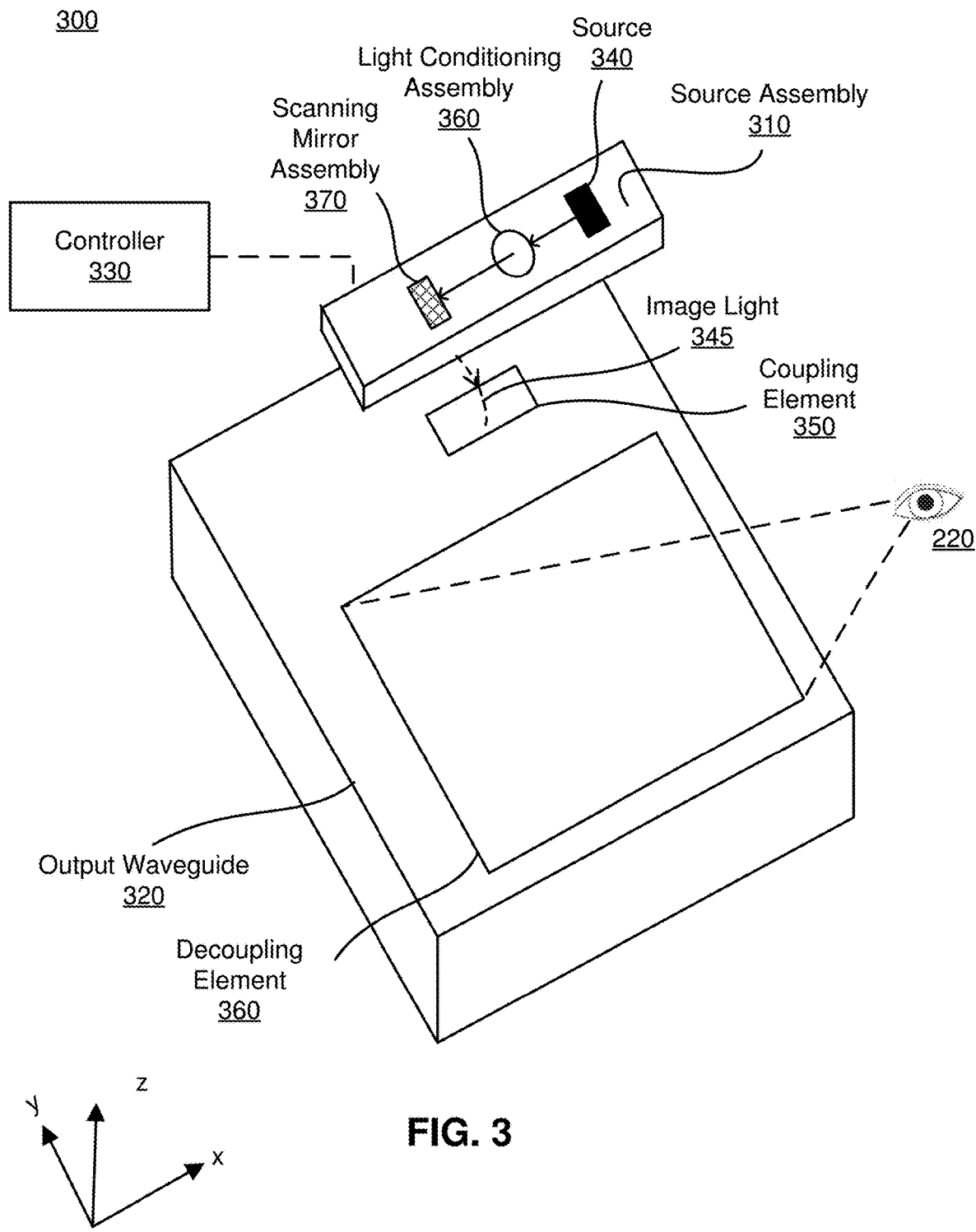
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 (may also be referred to as a scanning waveguide display) is a component (e.g., display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source 340, a light conditioning assembly 360, and a scanning mirror assembly 370, described in detail below with reference to FIG. 4. The source assembly 310 generates and outputs image light 345 to a coupling element 350 of the output waveguide 320.

The source 340 is a source of light that generates at least a coherent or partially coherent image light. The source 340 emits light in accordance with one or more illumination parameters received from the controller 330. The source 340 includes one or more source elements, including, but not restricted to MicroLEDs, as described in detail below with reference to FIG. 4.

The output waveguide 320 is an optical waveguide that outputs image light to an eye 220 of a user. The output waveguide 320 receives the image light 340 at one or more coupling elements 350, and guides the received input image light to one or more decoupling elements 360. In some embodiments, the coupling element 350 couples the image light 340 from the source assembly 310 into the output waveguide 320. The coupling element 350 may be, e.g., a diffraction grating, a holographic grating, some other element that couples the image light 340 into the output waveguide 320, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 is controlled by changing an orientation and position of the image light 340 entering the coupling element 350. For example, the pitch of the diffraction grating may be in the range of 300 nm to 600 nm.

The output waveguide 320 may be composed of one or more materials that facilitate total internal reflection of the image light 340. The output waveguide 320 may be composed of e.g., silicon, plastic, glass, or polymers, or some combination thereof. The output waveguide 320 has a relatively small form factor for a head-mounted display. For example, the output waveguide 320 may be approximately 50 mm wide along X-dimension, 30 mm long along Y-dimension and 0.5-1 mm thick along Z-dimension. In some embodiments, the output waveguide 320 is a 2D optical waveguide.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 340. The scanning instructions may include, e.g., a type of a source of image light (e.g. monochromatic, polychromatic), a scanning rate, an orientation of a scanning mirror assembly, one or more illumination parameters (described below with reference to FIG. 4 and FIG. 5), or some combination thereof. The controller 330 includes a combination of hardware, software, and/or firmware not shown here so as not to obscure other aspects of the disclosure.

Figure 4:
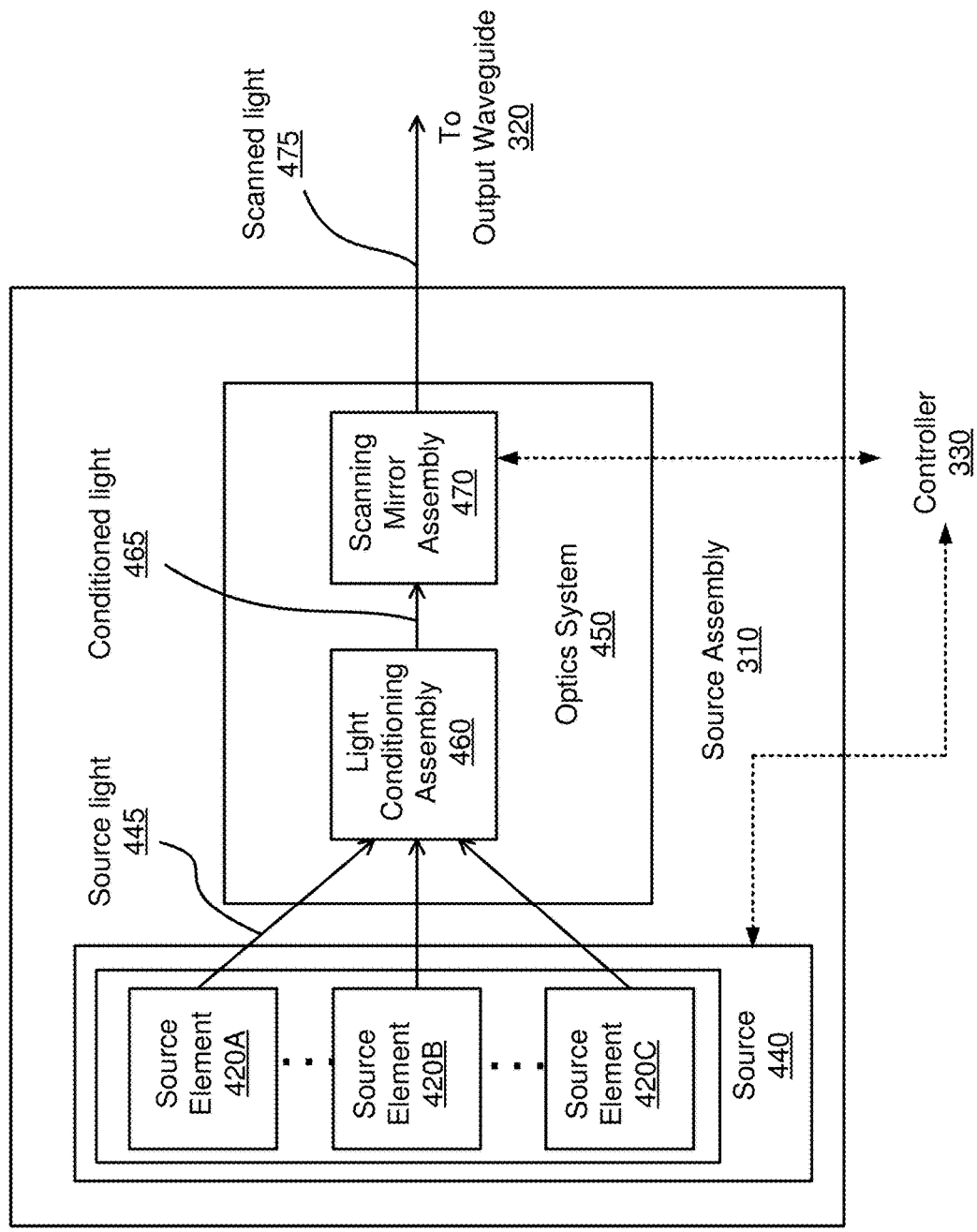
FIG. 4 illustrates a block diagram of a source assembly with a 1D source, the source assembly outputting a scanned light, in accordance with an embodiment.

FIG. 4 illustrates a block diagram of the source assembly 310 of FIG. 3 with a 1D source, the source assembly 310 outputting a scanned light, in accordance with an embodiment. The source assembly 310 includes a source 440, and an optics system 450. The source 440 is an embodiment of the source 340 of FIG. 3. The optics system 450 includes a light conditioning assembly 460 and a scanning mirror assembly 470. The light conditioning assembly 460 is an embodiment of the light conditioning assembly 360 of FIG. 3. The scanning mirror assembly 470 is an embodiment of the scanning mirror assembly 370 of FIG. 3. The source assembly 310 generates light in accordance with scanning instructions from the controller 330 of FIG. 3.

The source 440 is a source of light that generates at least a coherent or partially coherent image light. The source 440 emits light in accordance with one or more illumination parameters received from the controller 330. The source 440 includes one or more source elements 420. The source element 420 may be LEDs with at least ultra-high brightness, low power consumption, and a low footprint. The source element 420 may be, e.g., MicroLEDs, organic LEDs (OLEDs), a superluminescent LED (SLED), and organic MicroLEDs. A MicroLED is a LED that can be made small such that light emission area can be made to the order of a micron to a few tens of microns. For example, GaN-based inorganic LEDs can be made orders of magnitude brighter than OLEDs with a light emission area of few microns. The source assembly 310 of FIG. 4 may include different embodiments of the source element 420 as discussed below with reference to FIG. 9A-E.

In one embodiment, the source element 420 may be arranged in a concave curved and linear fashion. For example, the source 440 may have a radius of curvature ranging from few millimeters to few centimeters depending on the display size and a length of few millimeters. An advantage of a curved array is that it is much easier a compact lens to have high quality image on curved surface without correcting the field of curvature of the lens. In alternate embodiments, the source element 420 may be arranged in a flat and linear fashion.

The source element 420 emits a source light 445 to the optics system 450. In some embodiments, the source light 445 may emit one or more colors (e.g. red, green, and blue). For example, the source element 420A emits a red source light, the source element 420B emits a blue source light, and the source element 420C emits a green source light. Additionally, in some embodiments, one or more of the source elements may emit light in the infrared.

The optics system 450 includes a light conditioning assembly 460 and a scanning mirror assembly 470. The light conditioning assembly 460 conditions the source light 445 and emits conditioned light to the scanning mirror assembly 470. Conditioned light is light conditioned for incidence on the scanning mirror assembly 470. The light conditioning assembly 460 includes one or more optical components that condition the light from the source 440. Conditioning light from the source 440 may include, e.g., expanding, collimating, correcting for one or more optical errors (e.g., field curvature, chromatic aberration, etc.), some other adjustment of the light, or some combination thereof. The light conditioning assembly 460 conditions the source light 445 and emits conditioned light 465 to the scanning mirror assembly 470.

The scanning mirror assembly 470 includes one or more optical elements that redirect image light via one or more reflective portions of the scanning mirror assembly 470. Where the image light is redirected toward is based on specific orientations of the one or more reflective portions. In some embodiments, the scanning mirror assembly includes a single scanning mirror that is configured to scan in at least two dimensions. In other embodiments, the scanning mirror assembly 470 may include a plurality of scanning mirrors that each scan in orthogonal directions to each other. The scanning mirror assembly 470 may raster scan (horizontally, or vertically). In some embodiments, the scanning mirror assembly 470 may perform a controlled vibration along the horizontal and/or vertical directions with a specific frequency of oscillation to scan along two dimensions and generate a two-dimensional projected line image of the media presented to user's eyes. For example, the scanning mirror assembly 470 may undergo an oscillation with peak-to-peak amplitude of few hundreds of nanometers per second along the vertical direction based on the desired frequency of oscillation. The scanning mirror assembly 470 emits a scanned light 475 based on the collimated light 465. The scanning mirror assembly 470 outputs the scanned light 475 at a particular orientation (in accordance with the scanning instructions) toward the output waveguide 320.

In some embodiments, the scanning mirror assembly 470 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the scanned light 475. The scanned light 475 from the galvanometer mirror represents a two-dimensional line image of the media presented to user's eyes.

The controller 330 controls the source 440 and the scanning mirror assembly 470. The controller 330 takes content for display, and divides the content into discrete sections. The controller 330 instructs the source 440 to sequentially present the discrete sections. The controller 330 instructs the scanning mirror assembly 470 to scan the presented discrete sections to different areas of a coupling element of the output waveguide. Accordingly, at the exit pupil of the output waveguide 320 each discrete portion is presented in a different location. While each discrete section is presented at different times, the presentation and scanning of the discrete sections occurs fast enough such that a user's eye integrates the different sections into a single image or series of images.

For example, in embodiments where the source 440 includes a linear one-dimensional array of source elements 420, the content is divided by the controller 330 into lines where the lines are scanned out to different areas of the coupling element of the output waveguide 320, such that, at the exit pupil of the output waveguide 320 each of the lines are presented at a different location which a user's eye integrates into a single image or series of images.

Figure 5:
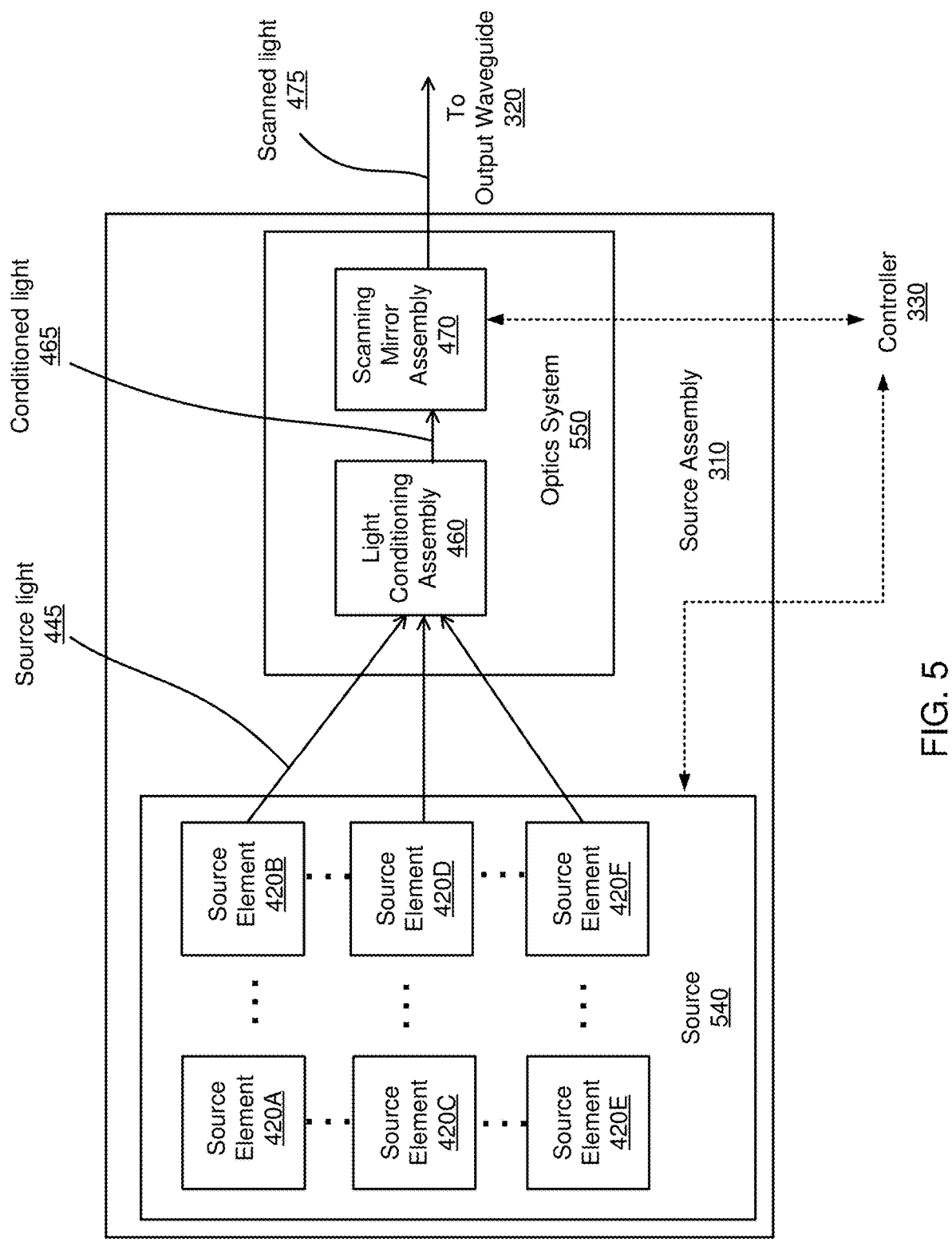
FIG. 5 illustrates a block diagram of a source assembly with a 2D source, in accordance with an embodiment.

FIG. 5 illustrates a block diagram of a source assembly with a 2D source, in accordance with an embodiment. The source assembly 310 includes a source 540, and an optics system 550. The source 540 is an embodiment of the source 340 of FIG. 3. The optics system 550 is an embodiment of the optics system 450 of FIG. 4. The source assembly 310 generates light in accordance with scanning instructions from the controller 330 of FIG. 3.

The optics system 550 includes the light conditioning assembly 460 details of which presented above with reference to FIG. 4. In the embodiment of FIG. 5, the light conditioning assembly 460 outputs the conditioned light 465 to the output waveguide 320.

The controller 330 takes content for display, and divides the content into discrete sections. The controller 330 instructs the source 540 to sequentially present the discrete sections. The controller 330 sends scanning instructions that cause the source assembly 310 to render light such that image light exiting the decoupling element 360 of the output waveguide 320 scans out one or more 2D images. For example, the scanning instructions may cause the source assembly 310 to scan out an image in accordance with a scan pattern (e.g., raster, interlaced, etc.). The scanning instructions control an intensity of light emitted from the source 540, and the optics system 550 scans out the image by rapidly adjusting orientation of the emitted light. If done fast enough, a human eye integrates the scanned pattern into a single 2D image.

Figure 6:
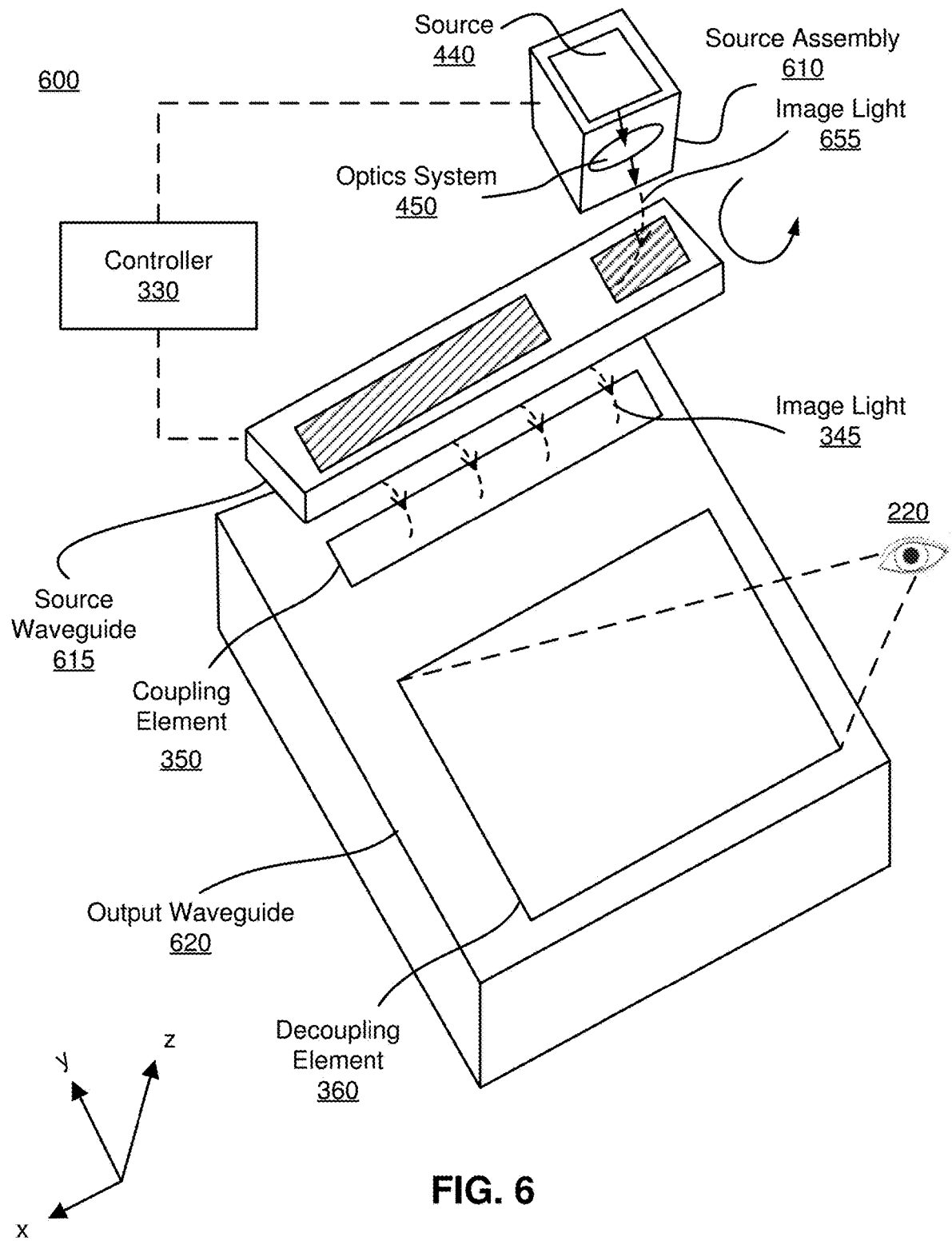
FIG. 6 illustrates an isometric view of a waveguide display, in accordance with an embodiment.

FIG. 6 illustrates an isometric view of a waveguide display 600, in accordance with an embodiment. In some embodiments, the waveguide display 600 (may also be referred to as a scanning waveguide display) is a component (e.g., display assembly 210) of the NED 100. In alternate embodiments, the waveguide display 600 is part of some other NED, or other system that directs display image light to a particular location.

The waveguide display 600 includes a source assembly 610, a source waveguide 615, an output waveguide 620, and a controller 330. The source assembly 610 is an embodiment of the source assembly 310 of FIG. 4. For purposes of illustration, FIG. 3 shows the waveguide display 600 associated with a single eye 220, but in some embodiments, another waveguide display separate (or partially separate) from the waveguide display 600, provides image light to another eye of the user. In a partially separate system, one or more components may be shared between waveguide displays for each eye.

The source waveguide 615 transmits image light generated by an optical source. The source waveguide 615 receives the image light 655 generated by the source 440 of the source assembly 610. The source waveguide 615 reflects the received image light 655 and outputs the image light 345 to a coupling element 350 of the output waveguide 620, as described in detail below with reference to FIG. 7. In some embodiments, the source waveguide 615 performs a rotation along one dimension (e.g. X-dimension) while scanning the image light generated by the source 440. The source waveguide 615 includes an actuator assembly that performs the rotation of the source waveguide 615. The actuator assembly includes one or more mechanical actuators that perform a rotational motion in either clockwise or anti-clockwise direction at a specific frequency.

The output waveguide 620 is an optical waveguide that outputs image light to an eye 220 of a user. The output waveguide 620 receives the image light 345 at one or more coupling elements 350, and guides the received input image light to one or more decoupling elements 360. In some embodiments, the coupling element 350 couples the image light 345 from the source waveguide 615 into the output waveguide 320. The coupling element 350 may be, e.g., a diffraction grating, a holographic grating, some other element that couples the image light 345 into the output waveguide 620, or some combination thereof. For example, in embodiments where the coupling element 350 is diffraction grating, the pitch of the diffraction grating is chosen such that total internal reflection occurs, and the image light 345 propagates internally toward the decoupling element 360. For example, the pitch of the diffraction grating may be in the range of 300 nm to 600 nm.

The decoupling element 360 decouples the total internally reflected image light from the output waveguide 620. The decoupling element 360 may be, e.g., a diffraction grating, a holographic grating, some other element that decouples image light out of the output waveguide 620, or some combination thereof. For example, in embodiments where the decoupling element 360 is a diffraction grating, the pitch of the diffraction grating is chosen to cause incident image light to exit the output waveguide 620. An orientation and position of the image light exiting from the output waveguide 620 is controlled by changing an orientation and position of the image light 345 entering the coupling element 350. For example, the pitch of the diffraction grating may be in the range of 300 nm to 600 nm.

The output waveguide 620 may be composed of one or more materials that facilitate total internal reflection of the image light 345. The output waveguide 620 may be composed of e.g., silicon, plastic, glass, or polymers, or some combination thereof. The output waveguide 620 has a relatively large form factor. For example, the output waveguide 620 may be approximately 50 mm wide along X-dimension, 30 mm long along Y-dimension and 0.5-1 mm thick along Z-dimension. In some embodiments, the output waveguide 620 is a 2D optical waveguide.

The controller 330 controls the scanning operations of the source assembly 610 and the source waveguide 615. The controller 330 determines scanning instructions for the source assembly 610 and the source waveguide 615 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 610 to project image light 655 on to the source waveguide 615. Scanning instructions are also the instructions used by the actuator assembly of the source waveguide 615 to transmit the image light 345. For example, the scanning instructions may communicate the direction and frequency of rotation to the actuator assembly. The scanning instructions may include, e.g., a type of a source of image light (e.g. monochromatic, polychromatic), a scanning rate, an orientation of the source waveguide 615, a frequency of rotation of the source waveguide 615, one or more illumination parameters (described above with reference to FIG. 4 and FIG. 5), or some combination thereof. In some embodiments, the actuator assembly may be separate from the source waveguide 615 and located inside the controller 330. The controller 330 includes a combination of hardware, software, and/or firmware not shown here so as not to obscure other aspects of the disclosure.

Figure 7:
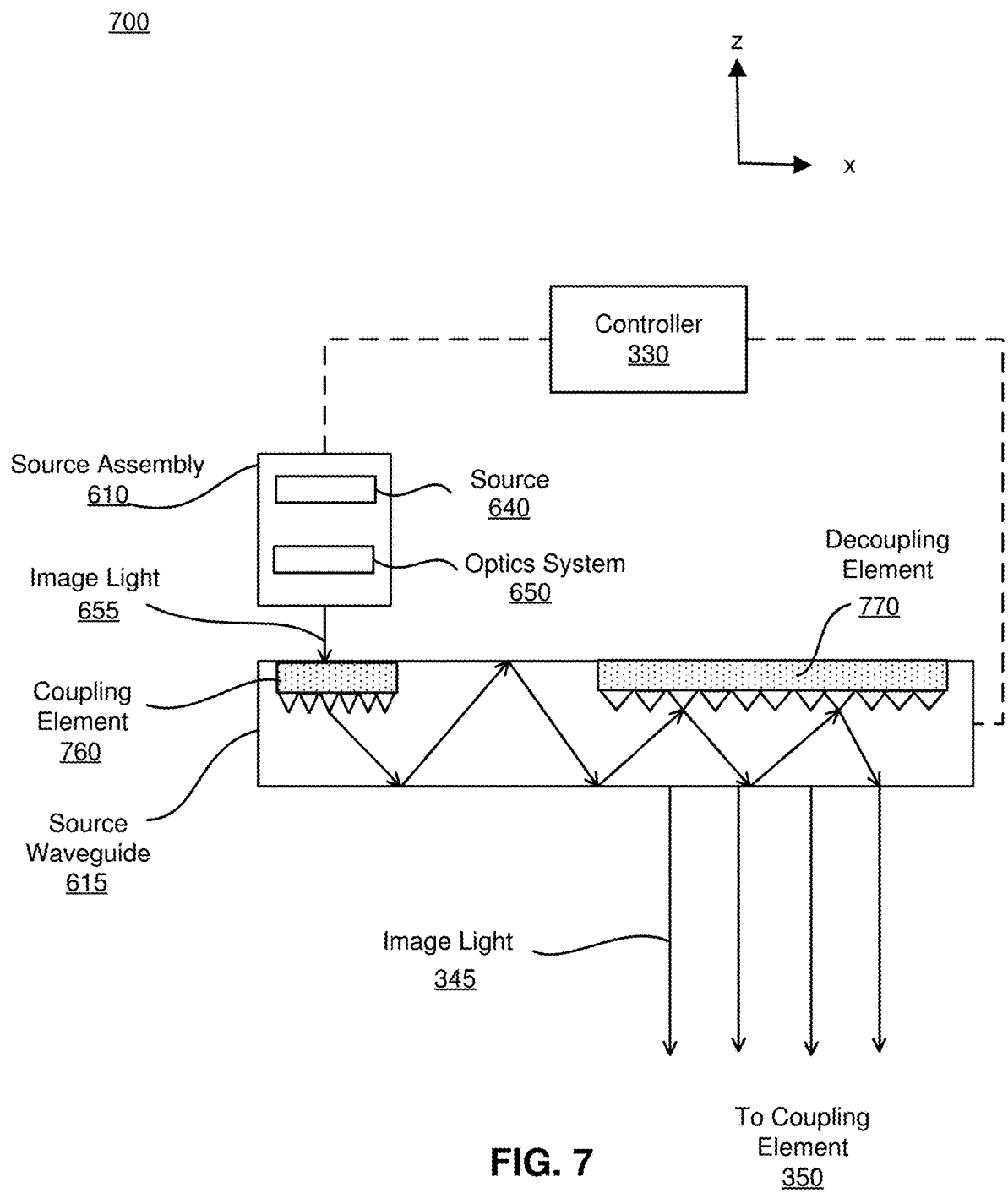
FIG. 7 illustrates a cross-section of a scanning waveguide display, in accordance with an embodiment.

FIG. 7 illustrates a cross-section 700 of the source assembly 610 and the source waveguide 615, in accordance with an embodiment.

The source assembly 610 generates light in accordance with scanning instructions from the controller 330. The source assembly 610 includes a source 640, and an optics system 650. The source 640 is a source of light that generates at least a coherent or partially coherent image light. The source 640 may be, e.g., laser diode, a vertical cavity surface emitting laser, a light emitting diode, a tunable laser, or some other light source that emits coherent or partially coherent light. The source 640 emits light in a visible band (e.g., from about 390 nm to 700 nm), and it may emit light that is continuous or pulsed. In some embodiments, the source 640 may be a laser that emits light at a particular wavelength (e.g., 532 nanometers). The source 640 emits light in accordance with one or more illumination parameters received from the controller 330. An illumination parameter is an instruction used by the source 640 to generate light. An illumination parameter may include, e.g., source wavelength, pulse rate, pulse amplitude, beam type (continuous or pulsed), other parameter(s) that affect the emitted light, or some combination thereof.

The optics system 650 includes one or more optical components that condition the light from the source 640. Conditioning light from the source 640 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 650 (and also the source assembly 610) is referred to as image light 655. The optics system 650 outputs the image light 655 at a particular orientation (in accordance with the scanning instructions) toward the source waveguide 615. In alternate embodiments, the optics system 650 outputs the image light 655 to the output waveguide 320.

The source waveguide 615 is an optical waveguide. The source waveguide 615 may be composed of one or more materials that facilitate total internal reflection of the image light 655. The source waveguide 615 may be composed of e.g., silicon, plastic, glass, or polymers, or some combination thereof. The source waveguide 615 has a relatively small form factor. For example, the source waveguide 615 may be approximately 50 mm long along X-dimension, 3 mm wide along Y-dimension, and 0.5-1 mm thick along Z-dimension. In some embodiments, the source waveguide 615 is a narrow and long 1D optical waveguide.

The source waveguide 615 includes a coupling element 760 and a decoupling element 770. The source waveguide 615 receives the image light 655 emitted from the source assembly 610 at the coupling element 760. The coupling element 760 couples the image light 655 from the source assembly 610 into the source waveguide 615. The coupling element 760 may be, e.g., a diffraction grating, a holographic grating, some other element that couples the image light 655 into the source waveguide 615, or some combination thereof. For example, in embodiments where the coupling element 760 is diffraction grating, the pitch of the diffraction grating is chosen such that total internal reflection occurs, and the image light 655 propagates internally toward the decoupling element 770. For example, the pitch of the diffraction grating may be in the range of 300 nm to 600 nm.

The decoupling element 770 decouples the total internally reflected image light 655 from the source waveguide 615. The decoupling element 770 may be, e.g., a diffraction grating, a holographic grating, some other element that decouples image light out of the source waveguide 615, or some combination thereof. For example, in embodiments where the decoupling element 770 is a diffraction grating, the pitch of the diffraction grating is chosen to cause incident image light to exit the source waveguide 615. An orientation of the image light exiting from the source waveguide 615 may be altered by varying the orientation of the image light exiting the source assembly 610, varying an orientation of the source assembly 610, or some combination thereof. For example, the pitch of the diffraction grating may be in the range of 300 nm to 600 nm.

The image light 345 exiting the source waveguide 615 is expanded at least along one dimension (e.g., may be elongated along X-dimension). The image light 345 couples to an output waveguide 320 as described above with reference to FIG. 3.

The controller 330 controls the source assembly 610 by providing scanning instructions to the source assembly 610. The scanning instructions cause the source assembly 610 to render light such that image light exiting the decoupling element 360 of the output waveguide 320 scans out one or more 2D images. For example, the scanning instructions may cause the source, etc.). The scanning instructions control an intensity of light emitted from the source assembly 610 (via adjustments to optical elements in the optics system 650) to scan out an image in accordance with a scan pattern (e.g., raster, interlaced the source 640, and the optics system 650 scans out the image by rapidly adjusting orientation of the emitted light. If done fast enough, a human eye integrates the scanned pattern into a single 2D image.

The controller 330 also controls the source waveguide 615 by providing scanning instructions to the source waveguide 615. The scanning instructions include, e.g., an orientation of the source waveguide 615, a frequency of rotation of the source waveguide 615, etc. In one example, the scanning instructions from the controller 330 may cause the source waveguide 615 to rotate in a clockwise-direction at a frequency of 5 rpm in an orthogonal dimension (e.g. X-dimension) that causes the rendering of one or more discrete sections in the content for display.

Figure 8:
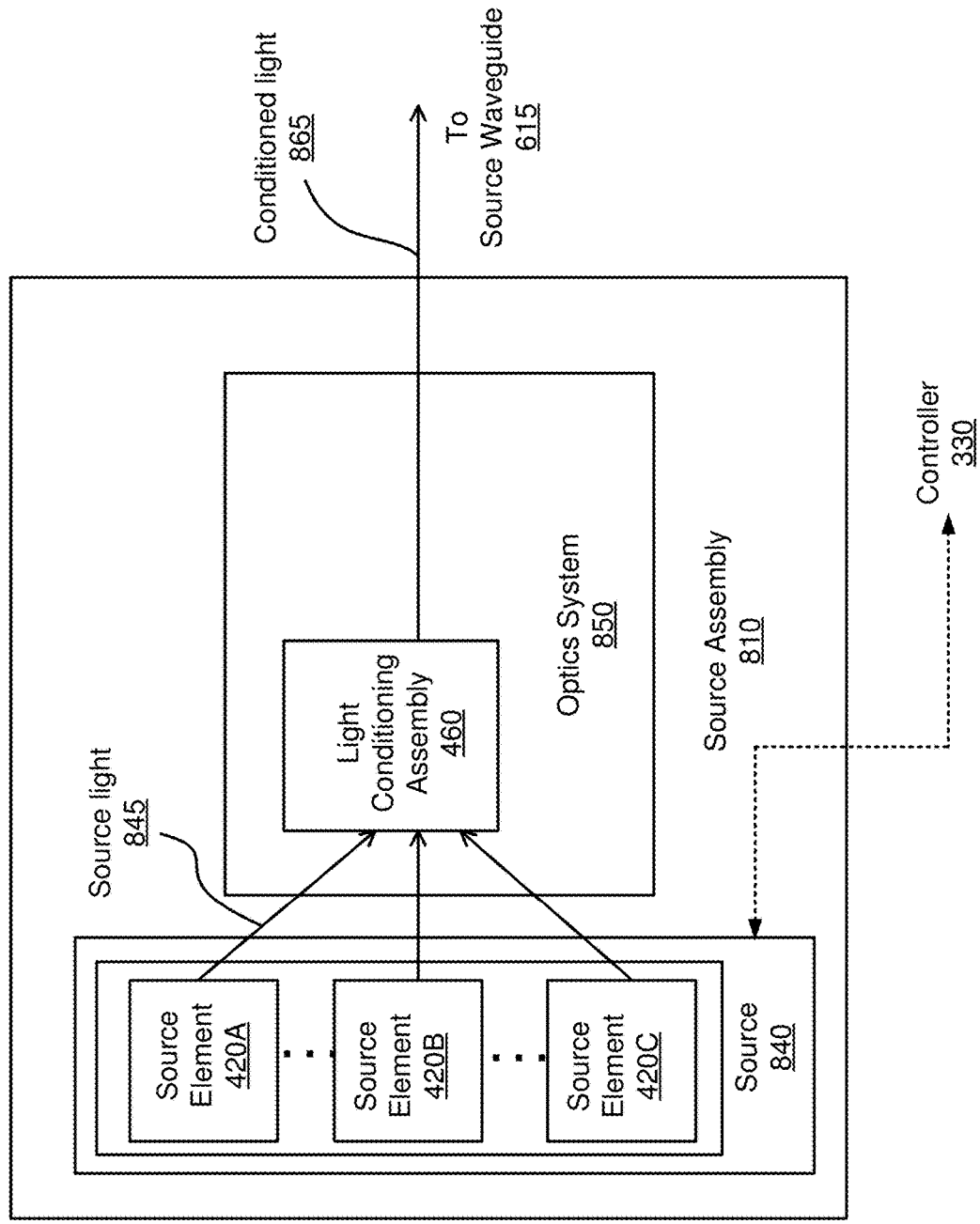
FIG. 8 illustrates a block diagram of a source assembly with the 1D source, in accordance with an embodiment.

FIG. 8 illustrates a block diagram of a source assembly 810 with the 1D source, in accordance with an embodiment. The source assembly 810 includes a source 840, and an optics system 850. The source 840 is an embodiment of the source 440 of FIG. 6. The optics system 850 is an embodiment of the optics system 450 of FIG. 6. The source assembly 810 generates light in accordance with scanning instructions from the controller 330 of FIG. 6.

The optics system 850 includes the light conditioning assembly 460 details of which presented above with reference to FIG. 4. In the embodiment of FIG. 8, the light conditioning assembly 460 outputs the conditioned light 865 to the source waveguide 615.

The controller 330 takes content for display, and divides the content into discrete sections. The controller 330 instructs the source 840 to sequentially present the discrete sections. The controller 330 sends scanning instructions that cause the source assembly 810 to render light such that image light exiting the decoupling element 360 of the output waveguide 620 scans out one or more 2D images. For example, the scanning instructions may cause the source assembly 810 to scan out an image in accordance with a scan pattern (e.g., raster, interlaced, etc.). The scanning instructions control an intensity of light emitted from the source 840, and the optics system 850 scans out the image by rapidly adjusting orientation of the emitted light. If done fast enough, a human eye integrates the scanned pattern into a single 2D image. The controller 330 instructs the source waveguide 615 to perform a scanning operation in an orthogonal dimension that renders the display of one or more discrete sections in the content for display.

Turning now to a discussion of source element geometries and organization, FIGS. 9A-D depict various layouts for source arrays. In the source arrays, a die represents a source element. Additionally, the dies in the source arrays have a square emission area. The square emission area allows for the dies to be densely packed together which facilitates a reduction in form factor of a source array. In alternate embodiments, the dies may have other shapes (e.g., rectangular, hexagonal, circular, etc.). Accordingly, the dies in the source arrays have a corresponding shape for the emission area.

Figure 9C:
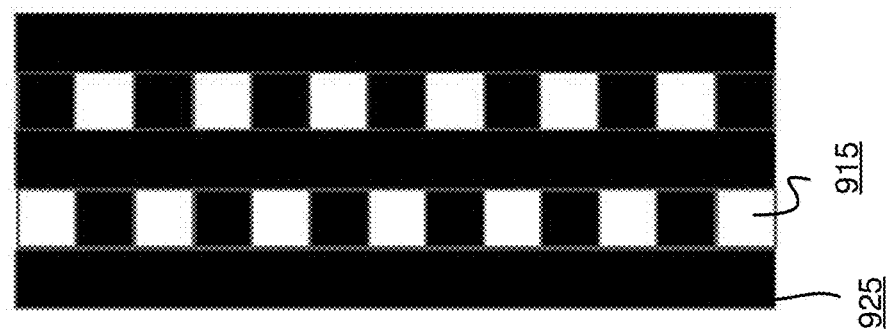
FIG. 9C illustrates an array with non-adjacent dies, in accordance with an embodiment.
Figure 9B:
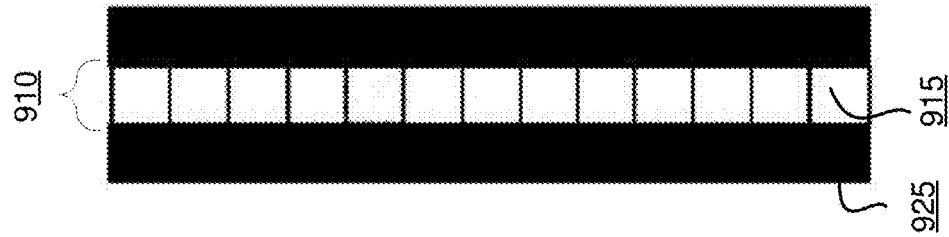
FIG. 9B illustrates an array that includes an optical isolator, in accordance with an embodiment.
Figure 9A:
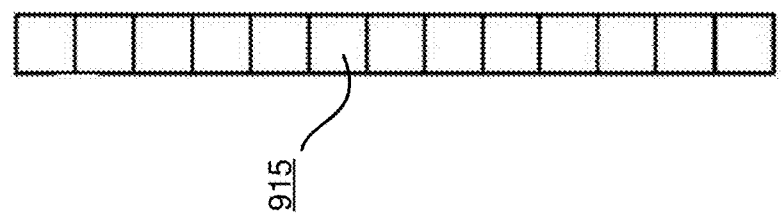
FIG. 9A illustrates an array with adjacent dies, in accordance with an embodiment.

FIG. 9A illustrates an array 910 of adjacent dies, in accordance with an embodiment. The array 910 represents an embodiment of the source 440 of FIG. 4. The array 910 includes a plurality of dies 915 that are placed in a one-dimensional array. In some embodiments, the dies may be arranged in a linear and flat array along one dimension. In alternate embodiments, the dies may be arranged in a linear and curved array along one dimension. The dies 915 are monochrome. In some embodiments, all of the dies 915 emit light in the same range (i.e., all same color). In alternate embodiments, one or more of the dies 915 in the array 910 emit light in ranges different from other dies 915 in the array 910.

FIG. 9B illustrates an array 920 that includes an optical isolator 925, in accordance with an embodiment. The array 920 is the array 910 of FIG. 9A, but includes an additional optical isolator 925 that reduces optical interference with adjacent source elements. Each of the dies 915 includes four outer edges (sides), and at least two sides of each die 915 is in contact with the optical isolator 925. The optical isolator 925 may be composed of, for example, Aluminum, some other material metal, some other material that reduces optical interference with adjacent source elements, or some combination thereof. The optical isolator 925 may be formed around dies 915, e.g., as a coating, film, etc., during the manufacturing process. In the embodiment of FIG. 9B, the optical isolator 925 surrounds the two opposite sides of the die 915.

FIG. 9C illustrates an array 930 with non-adjacent dies, in accordance with an embodiment. The array 930 is functionally similar to the array 910 of FIG. 9A, but includes dies 915 that are placed in a non-adjacent fashion. The non-adjacent arrangement of the dies 915 helps to avoid crosstalk (optical interference) between the image light output by each of the dies 915. In the embodiment of FIG. 9C, the optical isolator 925 surrounds the die 915 in at least three of the four sides.

Figure 9E:
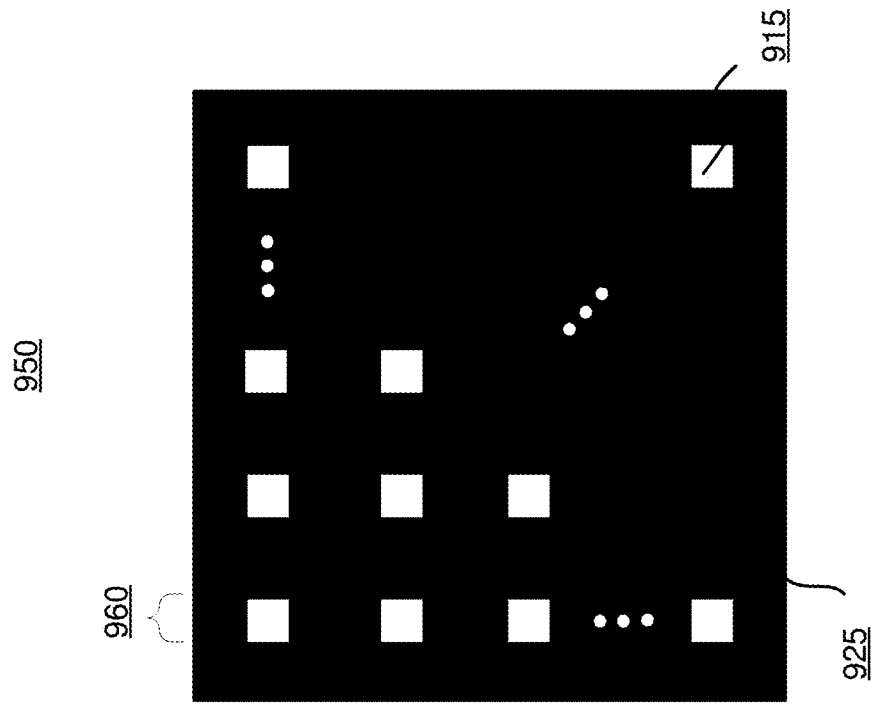
FIG. 9E illustrates a 2D sparse array, in accordance with an embodiment.
Figure 9D:
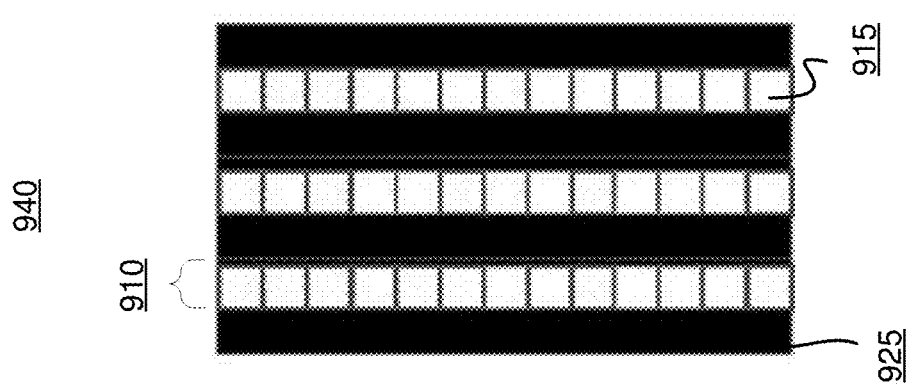
FIG. 9D illustrates a stacked array of three columns of 1D array, in accordance with an embodiment.

FIG. 9D illustrates a stacked array 940 of three columns of 1D array, in accordance with an embodiment. The stacked array 940 is structurally similar to the array 920 of FIG. 9B. In some embodiments, the 2D array 940 includes a plurality of arrays 910 arranged in a linear fashion, wherein an optical isolator 925 is between adjacent arrays 910. The aggregate structure of alternating array 910 and the optical isolator 925 form a 2D array. In FIG. 9D, the 2D array 940 includes three arrays 910, however, in other embodiments the stacked array 940 may include some other number of arrays 910. The arrays 910 may all emit light in the same range (i.e., all same color). In alternate embodiments, one or more of the arrays 910 in the stacked array 940 emit light in ranges different from another array 910 in the stacked array 940. For example, there may be three arrays 910, one of which emits red light, one of which emits green light, and one of which emits blue light. In another example, at least one of the arrays 910 emits light in the infrared. In some embodiments, the stacked array 940 may include a control circuit that performs the controlling of at least the color intensity, brightness, and duty-cycle of operating each of the individual arrays 910 inside.

FIG. 9E illustrates a 2D sparse array 950, in accordance with an embodiment. The 2D sparse array 950 is an array of dies 915 spaced apart to form a sparse array along two dimensions. In some embodiments, the 2D sparse array 950 includes a plurality of arrays 960 arranged in a linear fashion, wherein each of the dies 915 in the plurality of arrays 960 is in contact with the optical isolator 925 on all four sides. In FIG. 9E, the 2D sparse array 950 includes four arrays 960, however, in other embodiments the 2D sparse array 950 may include some other number of arrays 960. In some embodiments, the 2D sparse array 950 includes a plurality of arrays 960 that are located at one or more distance of separation. For example, the 2D sparse array 950 includes a first distance of separation of 10 microns between a first array 960A and a second array 960B, and a second distance of separation of 50 microns between the second array 960B and a third array 960C, respectively. In a different embodiment, each of the dies 915 in each of the arrays 960 has one or more distance of separation. For example, a die 915A in the array 960 may be located at a distance of separation of 5 microns from a die 915B in the array 960, and a die 915C in the array 960 may be located at a distance of separation of 50 microns from the die 915B. The arrays 960 may all emit light in the same range (i.e., all same color). In alternate embodiments, one or more of the arrays 960 in the 2D sparse array 950 emit light in ranges different from another array 960 in the 2D sparse array 950. Each of the dies 915 includes four outer edges (sides), and at least two sides of each die 915 is in contact with the optical isolator 925. The 2D sparse array 950 includes the same number of dies 915 as the array 920 of FIG. 9B. In some embodiments, the 2D sparse array 950 is an embodiment of the source 540 of FIG. 5.

Turning now to a more detailed discussion of source design, to calculate how may MicroLEDs should be in a 2D array to achieve a given brightness, one begins with an average brightness of the MicroLEDS (e.g., approximately 500 k nits). Assuming a Lambertian emission pattern for MicoLEDs, and the max MicroLED intensity at die location is 350 W/cm$^2$, and the three colors used for display are 450 nm, 530 nm, and 615 nm (there is challenge to integrated packed array RGB on one chip). A single RGB group (i.e., pixel that includes a source element that emits red light, a source element that emits green light, and a source element that emits blue light) can emit an average of 8.4×108 Lumen/m$^2$ light when RGB pixel power densities are 350 W/cm$^2$, 310/cm$^2$, and 220 W/cm$^2$, respectively. The average brightness of over a single RGB group is 2.66×10$^8$ nit. Note that the display brightness may be reduced from this value due to scanning. The number (n) of RGB pixel groups needed to have a projector of an average brightness (B) is a linear function of the number of display pixels (N), and are related via the following equation:

$$n = B/(2.66 \times 10^8)/(n/3) \tag{1}$$

where B is the average brightness (e.g., 500K nit). For example, in the case of a 500 k nit projector, n≈6.3×10$^{-4}$ N.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in image light of the above disclosure.

Finally, the language used in the specification has been principally selected for readability and instructional purposes, and it may not have been selected to delineate or circumscribe the disclosed subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure.

What is claimed is:

1. A scanning waveguide display comprising:
    a light source configured to emit an image light;
    a source waveguide assembly including an entrance area and an exit area, the source waveguide assembly configured to receive the image light at the entrance area, expand the image light in at least one dimension of a two-dimensional image, and output an expanded image light from the exit area, the source waveguide assembly configured to rotate along the at least one dimension of the two-dimensional image; and
    an output waveguide assembly including an input area and an output area, the output waveguide assembly configured to receive the expanded image light outputted from the source waveguide assembly at the input area, and to output the expanded image light from a portion of the output area, a location of the portion of the output area based on a direction and position of the expanded image light.

2. The scanning waveguide display of claim 1, wherein the source waveguide assembly is configured to adjust the direction and position of the expanded image light.

3. The scanning waveguide display of claim 1, wherein the source waveguide assembly comprises an actuator configured to cause the source waveguide assembly to rotate.

4. The scanning waveguide display of claim 2, further comprising a controller configured to generate scanning instructions to cause the actuator to rotate at a frequency.

5. The scanning waveguide display of claim 1, wherein the light source includes a light source element configured to emit the image light at least partially coherent and a condition element configured to condition the image light.

6. A scanning waveguide display, comprising:
    a source assembly including:
        a light source configured to emit an image light, and
        a scanning mirror assembly configured to scan the image light for a two-dimensional line image, the scanning mirror assembly including one or more mirrors configured to scan along two dimensions; and
    an output waveguide assembly including an input area and an output area, the output waveguide assembly coupled to receive scanned image light at the input area and to output an expanded image light from a portion of the output area, a location of the portion of the output area based in part on a direction of the image light output from the scanning mirror assembly.

7. The scanning waveguide display of claim 6, wherein the output waveguide assembly is configured to condition the scanned image light.

8. The scanning waveguide display of claim 6, wherein the scanning mirror assembly is configured to adjust the direction of the scanned image light.

9. The scanning waveguide display of claim 6, further comprising a controller configured to generate scanning instructions to cause the scanning mirror assembly to scan the image light along the two dimensions.

10. The scanning waveguide display of claim 6, wherein the scanning mirror assembly includes a first mirror configured to scan along a first dimension of the two-dimensional line image and a second mirror configured to scan a second dimension of the two-dimensional line image, the first dimension and the second dimension orthogonal to each other.

11. The scanning waveguide display of claim 6, wherein the scanning mirror assembly comprises a galvanometer mirror or a MEMS mirror.

12. The scanning waveguide display of claim 6, wherein the light source comprises a plurality of source elements configured to emit the image light, the source elements positioned in a one-dimensional array and each to emit light representing a line of the two-dimensional line image.

13. The scanning waveguide display of claim 12, wherein the one-dimensional array is curved.

14. The scanning waveguide display of claim 6, wherein the light source comprises a plurality of source elements configured to emit the image light, the source elements positioned in a sparse two-dimensional array and each to emit light representing a portion of the two-dimensional line image.

15. The scanning waveguide display of claim 6, wherein the light source comprises a first source element configured to emit light having a wavelength in a first wavelength range and a second source element configured to emit light having a wavelength in a second wavelength range different from the first wavelength range.

16. The scanning waveguide display of claim 6, wherein the light source comprises a plurality of source elements configured to emit the image light, the source elements emitting light having the same wavelength.

17. The scanning waveguide display of claim 6, wherein the image light is at least partially coherent.

18. The scanning waveguide display of claim 6, wherein the light source comprises a plurality of source elements each selected from a group consisting of: a light-emitting diode (LED), a MicroLED, an organic light-emitting diode (OLED), an organic MicroLED, and a superluminescent light emitting diode (SLED).

19. The scanning waveguide display of claim 6, wherein the light source includes a plurality of source elements each having a plurality of sides, and wherein at least two of each source element's sides are in contact with an optical isolator configured to reduce optical interference.

20. The scanning waveguide display of claim 19, wherein for each source element the optical isolator is in contact with at least three of its plurality of sides.

* * * * *